United States Patent
Igarashi et al.

(10) Patent No.: US 8,600,599 B2
(45) Date of Patent: Dec. 3, 2013

(54) FUEL CELL VEHICLE

(75) Inventors: Daishi Igarashi, Utsunomiya (JP);
Takuya Shirasaka, Sakura (JP);
Kazunori Watanabe, Mooka (JP);
Katsumi Hayashi, Utsunomiya (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/465,573

(22) Filed: May 7, 2012

(65) Prior Publication Data

US 2012/0296505 A1   Nov. 22, 2012

(30) Foreign Application Priority Data

May 18, 2011   (JP) .................................. 2011-111033

(51) Int. Cl.
*G06F 7/00* (2006.01)

(52) U.S. Cl.
USPC .......................................................... 701/22

(58) Field of Classification Search
USPC ................................ 701/22; 180/65.21, 65.31
See application file for complete search history.

(56) References Cited

U.S. PATENT DOCUMENTS

| | | | |
|---|---|---|---|
| 2009/0105895 A1* | 4/2009 | Shige .............................. | 701/22 |
| 2011/0064976 A1 | 3/2011 | Shimoda | |

FOREIGN PATENT DOCUMENTS

| | | |
|---|---|---|
| DE | 101 45 514 A1 | 4/2003 |
| JP | 07-123515 A | 5/1995 |
| JP | 2005-44531 A | 2/2005 |
| JP | 2008-251489 A | 10/2008 |
| JP | 2009-046020 A | 3/2009 |
| JP | 2010-206927 A | 9/2010 |
| JP | 2011-066973 A | 3/2011 |

OTHER PUBLICATIONS

German Office Action dated Jan. 10, 2013, issued in corresponding German Patent Application No. 102012208197.6, (4 pages).
Japanese Office Action dated Jul. 16, 2013, issued in corresponding Japanese Patent Application No. 2011-111033, w/ partial English translation.
Japanese Office Action mailed Apr. 23, 2013, issued in corresponding Japanese Patent Application No. 2011-111033; with partial English translation (3 pages).

* cited by examiner

*Primary Examiner* — Kim T Nguyen
(74) *Attorney, Agent, or Firm* — Westerman, Hattori, Daniels & Adrian, LLP

(57) ABSTRACT

A FC vehicle includes a long distance hill climbing detector for detecting long distance hill climbing and a controller for, in the case where the long distance hill climbing detector detects the long distance hill climbing, controlling the allocation amount of electric power outputted from an FC such that the allocation amount is larger than the allocation amount before the detection of the long distance hill climbing.

4 Claims, 12 Drawing Sheets

FUEL CELL VEHICLE

CROSS-REFERENCE TO RELATED APPLICATION

This application is based upon and claims the benefit of priority from Japanese Patent Application No. 2011-111033 filed on May 18, 2011, of which the contents are incorporated herein by reference.

BACKGROUND OF THE INVENTION

1. Field of the Invention

The present invention relates to a fuel cell vehicle including a traction motor driven by use of a fuel cell and an energy storage device.

2. Description of the Related Art

Fuel cell vehicles including a traction motor by use of a fuel cell and a battery are known (U.S. Patent Application Publication No. 2009/0105895 (hereinafter referred to as "US 2009/0105895 A1"), Japanese Laid-Open Patent Publication No. 2009-046020 (hereinafter referred to as "JP 2009-046020 A")).

In US 2009/0105895 A1, when the accelerator opening degree change rate $\Delta Acc$ is large, the amount of battery assist is increased, and when the change rate $\Delta Acc$ is small, the amount of battery assist is reduced (see "Abstract" therein). The amount of battery assist is continuously adjusted based on the change rate $\Delta Acc$ until the difference $\Delta P$ between the drive power demand Pdr* and the output Pfc of the fuel cell becomes substantially zero (see S150, S155, and S190 of FIG. 3 therein). Further, in US 2009/0105895 A1, in comparison with the case of the normal mode, when a sport mode is selected, the amount of battery assist is increased, and when an economy mode is selected, the amount of battery assist is reduced (see Abstract and FIG. 8 therein).

Further, in JP 2009-046020 A, in order to suppress increase in the temperature of the fuel cell during hill climbing, when the temperature of the fuel cell 6 becomes the threshold value or more, the output of an air conditioner device 21 is decreased. Thus, by decreasing the amount of waste heat from a capacitor 22 of the air conditioner device 21 provided in front of a radiator 9 of the fuel cell 6, improvement in the cooling efficiency of the radiator 9 is achieved (see Abstract therein).

SUMMARY OF THE INVENTION

As described above, in US 2009/0105895 A1, the amount of battery assist is adjusted depending on the accelerator opening degree change rate $\Delta Acc$ and the running mode. However, no consideration is given to the amount of battery assist (output from the battery) at the time of long distance hill climbing (in particular, high speed hill climbing). Assuming that the control of US 2009/0105895 A1 is applied at the time of long distance hill climbing, and a state where the difference $\Delta P$ between the drive power demand Pdr* and the output Pfc of the fuel cell does not become substantially zero continues for a long time, since a state where the amount of battery assist is large continues, the battery may run out of electric power undesirably. In this regard, there is no description in JP 2009-046020 A.

The present invention has been made taking the problems of this type into account, and an object of the present invention is to provide a fuel cell vehicle which makes it possible to ensure a desired assist from an energy storage device at the time of high speed hill climbing.

A fuel cell vehicle according to the present invention includes a traction motor, a fuel cell, an energy storage device, a power distribution apparatus, a long distance hill climbing detector, and a controller. The fuel cell supplies electric power to the traction motor. The energy storage device supplies electric power to the traction motor, and the energy storage device is capable of being charged with regenerative electric power of the traction motor or electric power generated in the fuel cell. The power distribution apparatus controls targets to which electric power generated in the fuel cell, electric power outputted from the energy storage device, and regenerative electric power of the traction motor are supplied. The long distance hill climbing detector detects long distance hill climbing of the fuel cell vehicle. In the case where the long distance hill climbing detector detects the long distance hill climbing, the controller controls an allocation amount of electric power outputted from the fuel cell such that the allocation amount of electric power outputted from the fuel cell is larger than the allocation amount before the detection of the long distance hill climbing.

In the present invention, in the case where long distance hill climbing is detected, control is implemented such that the allocation amount of electric power outputted from the fuel cell is larger than that before detection of the long distance hill climbing. Thus, since the allocation amount of electric power outputted from the energy storage device is decreased relatively, during the long distance hill climbing of the fuel cell vehicle, it becomes possible to prevent the SOC of the energy storage device from being decreased at an early stage due to discharging of electric power at the large output, and prevent assistance by the energy storage device from being disabled at an early stage.

The fuel cell vehicle may further include a cooling apparatus for cooling the fuel cell by a coolant. In the case where the long distance hill climbing detector detects the long distance hill climbing, the output of the air conditioner may be limited depending on increase in the temperature of the fuel cell. In this manner, during the long distance hill climbing of the fuel cell vehicle, by limiting the output of the air conditioner, excessive electric power can be utilized for the output of the traction motor. Additionally, for example, in the case where heat from the air conditioner raises the temperature of the fuel cell or the coolant, or in the case where the coolant for the fuel cell is also utilized for cooling the air conditioner, by limiting the output from the air conditioner to suppress heat produced in the air conditioner, even if the output of the fuel cell is increased, it becomes possible to suitably protect the fuel cell against heat. Further, it becomes possible to prevent the output and efficiency of the fuel cell from being lowered due to overheating of the fuel cell.

If the energy storage device is a battery, an upper limit value of remaining battery level (state of charge: SOC) of the battery for performing power generation of the fuel cell may be set. If the remaining battery level exceeds the upper limit value, power generation of the fuel cell may not be performed, and in the case where the long distance hill climbing detector detects the long distance hill climbing, the upper limit value of the remaining battery level may be increased. Thus, during the long distance hill climbing, even if the SOC of the battery is high, power generation of the fuel cell can be performed. Therefore, even if the required load is kept high for long distance hill climbing, since the output of the fuel cell is suitably regulated in accordance with the load, it becomes possible to prevent the SOC of the battery from being decreased at an early stage, and prevent assistance by the battery from being disabled at an early stage.

An output upper limit value of the fuel cell may be set depending on the remaining battery level (state of charge), and in the case where the long distance hill climbing detector detects the long distance hill climbing, in a region where the remaining battery level is low, the output upper limit value of the fuel cell may be set to be lower in comparison with the case where the long distance hill climbing detector does not detect the long distance hill climbing. In this manner, it becomes possible to suppress overheating of the fuel cell, and maintain a desired drivability.

That is, in the present invention, except the case where the SOC of the battery is low from a time point immediately after long distance hill climbing is started, the SOC may be lowered gradually during the long distance hill climbing (in particular, high speed hill climbing). In the case where the output limit value of the fuel cell is increased (the output limit of the fuel cell is relaxed) during long distance hill climbing, the fuel cell could be overheated due to power generation before the SOC becomes low (Since heat produced in the fuel cell is proportional to the square of the power generation current, as the current is higher, the amount of heat produced in the fuel cell is increased). In the case where the fuel cell is overheated, it may become necessary to take some actions, e.g., significantly limit power generation of the fuel cell, or stop power generation of the fuel cell. In the case where such actions are required, drivability may become significantly poor in the middle of hill climbing. Thus, according to the present invention, in the region where the SOC is low, in the case where long distance hill climbing is detected, the output limit value of the fuel cell is lowered. Therefore, even if the long distance hill climbing continues, it becomes possible to suppress overheating of the fuel cell, and maintain a desired drivability.

Further, in the case where the output of the fuel cell is increased in the state where the power generation efficiency is low, the fuel gas is consumed rapidly. In order to address the problem, in the above structure, the amount of consumption of the fuel gas is suppressed at the time of long distance hill climbing. Thus, it becomes possible to prevent the fuel gas from being used excessively.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

1. Description Regarding Overall Structure

[1-1. Overall Structure]

Figure 1:
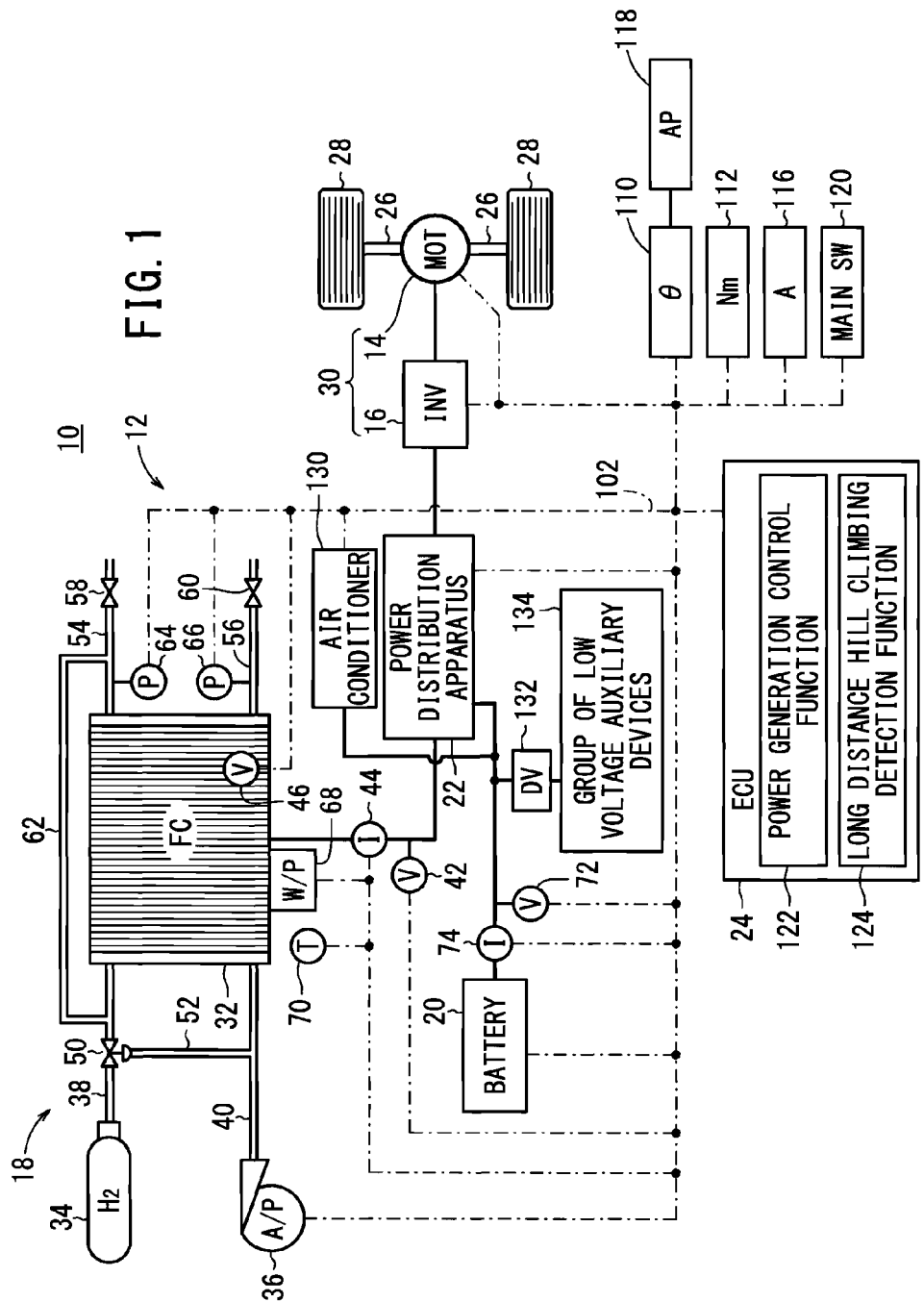
FIG. 1 is a diagram schematically showing a structure of a fuel cell vehicle according to an embodiment of the present invention.

FIG. 1 is a diagram schematically showing a structure of a fuel cell vehicle 10 (hereinafter referred to as the "FC vehicle 10" or "vehicle 10") according to an embodiment of the present invention. The FC vehicle 10 includes a vehicle power supply system 12 (hereinafter referred to as "a power supply system 12"), a traction motor 14, and an inverter (auxiliary device) 16.

The power supply system 12 includes a fuel cell unit 18 (hereinafter referred to as the "FC unit 18"), a battery 20 (energy storage device), a power distribution apparatus 22, and an electronic control unit (control device) 24 (hereinafter referred to as the "ECU 24").

[1-2. Drive System]

The motor 14 generates a driving force based on the electric power supplied from the FC unit 18 and the battery 20, and rotates wheels 28 using the driving force through a transmission 26. Further, the motor 14 outputs electric power generated by regeneration (regenerative electric power Preg) [W] to the battery 20. The regenerative electric power Preg may be outputted to a group of auxiliary devices (including an air pump 36, a water pump (cooling apparatus) 68, an air conditioner 130, and a group of low voltage auxiliary devices 134 as described later).

The inverter 16 has three phase full bridge structure, and carries out DC/AC conversion to convert direct current into alternating current in three phases. The inverter 16 supplies the alternating current to the motor 14, and supplies the direct current after AC/DC conversion as a result of regeneration to the battery 20 or the like through a power distribution apparatus 22.

It should be noted that the motor 14 and the inverter 16 are collectively referred to as a load 30. The load 30 may include components (auxiliary device) such as an air pump (reactant gas supply apparatus) 36, a water pump 68, an air conditioner 130, and a group of low voltage auxiliary devices, to described later.

[1-3. FC Unit 18]

The FC unit 18 includes a fuel cell stack 32 (hereinafter referred to as "a FC stack 32" or "a FC 32"). For example, the fuel cell stack 32 is formed by stacking fuel cells (hereinafter referred to as the "FC cells") each including an anode, a cathode, and a solid polymer electrolyte membrane interposed between the anode and the cathode. A hydrogen tank 34 and the air pump 36 are connected to the fuel cell stack 32 through their respective passages 38, 40. Hydrogen (fuel gas) as one reactant gas is supplied from the hydrogen tank 34, and a compressed air (oxygen-containing gas) as the other reactant gas is supplied from the air pump 36. Electrochemical reactions of the hydrogen and the air supplied from the hydrogen tank 34 and the air pump 36 to the FC stack 32 occur in the FC stack 32 to generate electric power, and the electric power generated (FC electric power Pfc) [W] in the power generation is supplied to the motor 14 and the battery 20.

The power generation voltage of the FC stack 32 (hereinafter referred to as the "FC voltage Vfc") [V] is detected by a voltage sensor 42, and the power generation current of the FC stack 32 (hereafter referred to as the "FC current Ifc") [A] is detected by a current sensor 44. The FC voltage Vfc and the FC current Ifc are outputted to the ECU 24. Further, the power generation voltage of each FC cell of the FC stack 32 (hereinafter referred to as the "cell voltage Vcell") [V] is detected by a voltage sensor 46, and outputted to the ECU 24.

A regulator 50 is provided in the passage 38 connecting the hydrogen tank 34 and the FC stack 32. A passage 52 branches from the passage 40 connecting the air pump 36 and the FC stack 32, and the passage 52 is connected to the regulator 50. Compressed air from the air pump 36 is supplied through the passage 52. The regulator 50 changes the opening degree of the valve depending on the pressure of the supplied compressed air, and regulates the flow rate of the hydrogen supplied to the FC stack 32.

A purge valve 58 and a back pressure valve 60 are provided respectively in a hydrogen passage 54 and an air passage 56 provided on the outlet side of the FC stack 32. The purge valve 58 discharges the hydrogen on the outlet side of the FC stack 32 to the outside of the vehicle 10, and the back pressure valve 60 regulates the pressure of the air. Further, a passage 62 connecting the passage 38 on the inlet side of the hydrogen and the passage 54 on the outlet side of the hydrogen is provided. The hydrogen discharged from the FC stack 32 is returned to the inlet side of the FC stack 32 through the passage 62. Pressure sensors 64, 66 are provided in the passages 54, 56 on the outlet side of the FC stack 32, and detection values (pressure values) are outputted from the pressure sensors 64, 66 to the ECU 24, respectively.

Further, the water pump 68 for cooling the FC stack 32 is provided adjacent to the FC stack 32. The water pump 68 circulates coolant water (coolant) in the FC stack 32. The temperature Tw [° C.] of the coolant water is detected by a temperature sensor 70, and outputted to the ECU 24.

[1-4. Battery 20]

The battery 20 is an energy storage device (energy storage) containing a plurality of battery cells. For example, a lithium-ion secondary battery, a nickel hydrogen battery, or a capacitor can be used as the battery 20. In the present embodiment, the lithium-ion secondary battery is used. The output voltage [V] of the battery 20 (hereinafter referred to as the "battery voltage Vbat") is detected by a voltage sensor 72, and the output current [A] of the battery 20 (hereinafter referred to as the "battery current Ibat") is detected by the current sensor 74. The battery voltage Vbat and the battery current Ibat are outputted to the ECU 24. The ECU 24 calculates the remaining battery level (state of charge) (hereinafter referred to as the "SOC") [%] of the battery 20 based on the battery voltage Vbat from the voltage sensor 72 and the battery current Ibat from the current sensor 74.

[1-5. Power Distribution Apparatus 22]

The power distribution apparatus 22 controls targets to which the FC electric power Pfc from the FC unit 18, the electric power [W] supplied from the battery 20 (hereinafter referred to as the "battery electric power Pbat"), and the regenerative electric power Preg from the motor 14 are supplied.

Figure 2:
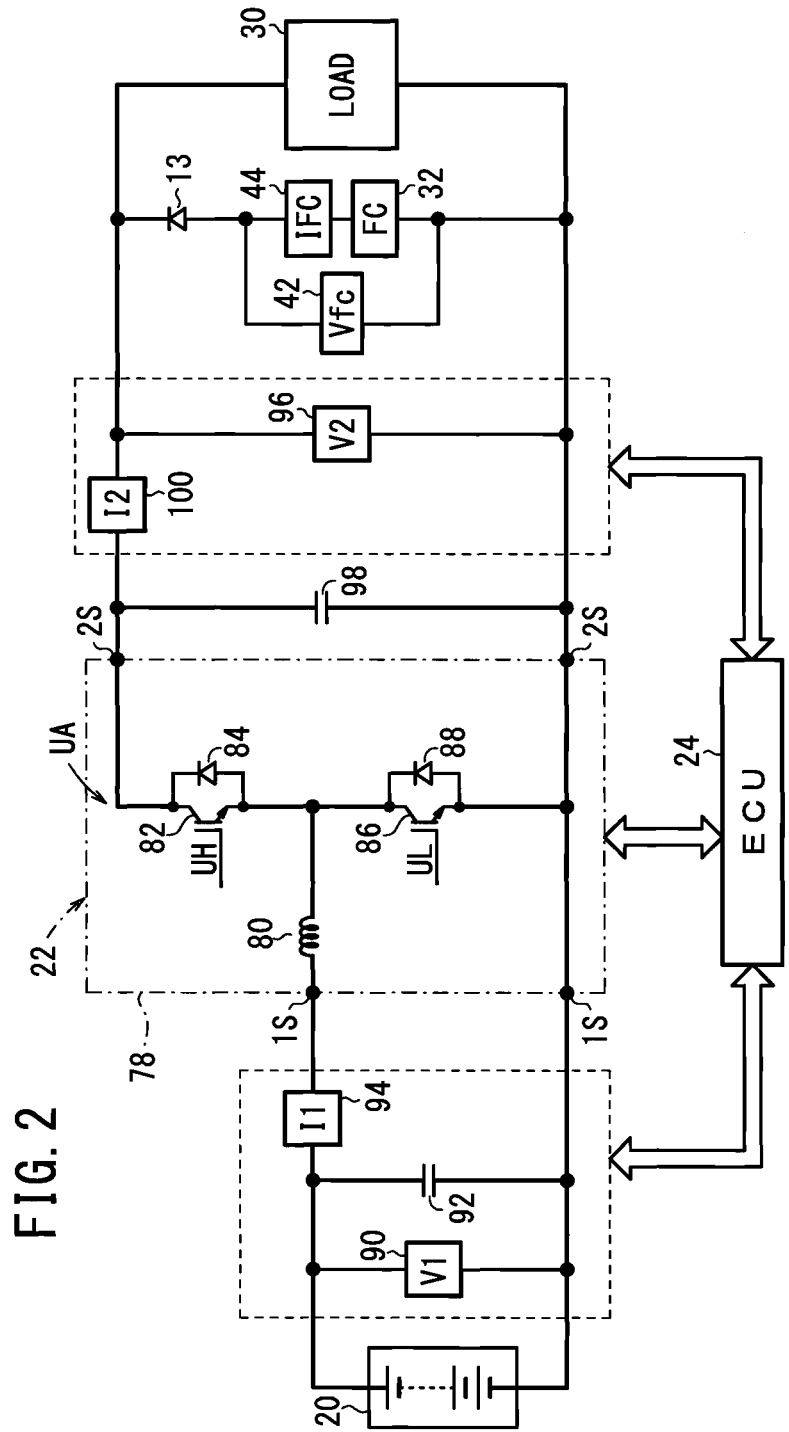
FIG. 2 is a diagram showing details of a DC/DC converter according to the embodiment.

FIG. 2 shows details of the power distribution apparatus 22 in the present embodiment. As shown in FIG. 2, the power distribution apparatus 22 includes a DC/DC converter 78 in which one side of the DC/DC converter 78 is connected to the primary side 1S where the battery 20 is provided, and the other side of the DC/DC converter 78 is connected to the secondary side 2S, which is connection points between the load 30 and the FC 32.

The DC/DC converter 78 is a chopper type step up/down voltage converter for increasing the voltage on the primary side 1S (primary voltage V1) [V] to the voltage on the secondary side 2S (secondary voltage V2) [V] (V1≤V2), and decreasing the secondary voltage V2 to the primary voltage V1.

As shown in FIG. 2, the DC/DC converter 78 includes a phase arm UA interposed between the primary side 1s and the secondary side 2S, and a reactor 80.

The phase arm UA includes an upper arm element (an upper switching element 82 and a diode 84) and a lower arm element (a lower arm switching element 86 and a diode 88). For example, MOSFET or IGBT is adopted in each of the upper arm switching element 82 and the lower arm switching element 86.

The reactor 80 is interposed between the middle point (common connection point) of the phase arm UA and the positive electrode of the battery 20. The reactor 80 is operated to release and accumulate energy during voltage conversion between the primary voltage V1 and the secondary voltage V2 by the DC/DC converter 78.

The upper arm switching element 82 is turned on when high level of a gate drive signal (drive voltage) UH is outputted from the ECU 24, and the lower arm switching element 86 is turned on when high level of a gate drive signal (drive voltage) UL is outputted from the ECU 24.

The ECU 24 detects primary voltage V1 by a voltage sensor 90 provided in parallel with a smoothing capacitor 92 on the primary side, and detects electrical current on the primary side (primary current I1) [A] by a current sensor 94. Further, the ECU 24 detects secondary voltage V2 by a voltage sensor 96 provided in parallel with the smoothing capacitor 98 on the secondary side, and detects electrical current on the secondary side (secondary current I2) [A] by a current sensor 100.

[1-6. ECU 24]

The ECU 24 controls the motor 14, the inverter 16, the FC unit 18, the battery 20, and the power distribution apparatus 22 (DC/DC converter 78) through a communication line 102 (see FIG. 1). For implementing the control, programs stored in a memory (ROM) are executed, and detection values obtained by various sensors such as the voltage sensors 42, 46, 72, 90, 96, the current sensors 44, 74, 94, 100, the pressure sensors 64, 66, and the temperature sensor 70 are used.

The various sensors herein include an opening degree sensor 110, a motor rotation number sensor 112, and a gradient sensor 116 (FIG. 1). The opening degree sensor 110 detects the opening degree [degrees] of an accelerator pedal 118 (hereinafter referred to as "an accelerator opening degree θ" or "opening degree θ"). The rotation number sensor 112 detects the rotation number [rpm] of the motor 14 (hereinafter referred to as "motor rotation number Nm" or "rotation number Nm"). The gradient sensor 116 detects the gradient A [°] of the road (gradient of the vehicle 10 in a longitudinal direction thereof). Further, a main switch 120 (hereinafter referred to as the "main SW 120") is connected to the ECU 24. The main SW 120 switches between supply and non-supply of the electric power from the FC unit 18 and the battery 20 to the motor 14. This main SW 120 can be operated by a user.

The ECU 24 includes a microcomputer. Further, as necessary, the ECU 24 has a timer and input/output (I/O) interfaces such as an A/D converter and a D/A converter. The ECU 24 may comprise only a single ECU. Alternatively, the ECU 24 may comprise a plurality of ECUs for each of the motor 14, the FC unit 18, the battery 20, and the power distribution apparatus (DC/DC converter 78) 22.

The ECU 24 has a power generation control function (controller) 122 and a long distance hill climbing detection function (long distance hill climbing detector) 124. The power generation control function 122 is a function of controlling power generation of the FC 32. The long distance hill climbing detection function 124 is a function of detecting long distance hill climbing of the vehicle 10. These functions 122, 124 will be described in detail later.

[1-7. Air Conditioner 130]

As shown in FIG. 1, the vehicle 10 further includes an air conditioner 130. A capacitor (not shown) of the air conditioner 130 is provided in front of a radiator (not shown) of the FC 32. For example, detailed structure (including layout) of the capacitor and the radiator can be provided based on the description of JP 2009-046020 A.

The air conditioner 130 is operated in accordance with instructions from the ECU 24. At this time, the air conditioner 130 obtains electric power from at least one of the FC 32, the battery 20, and the motor 14.

[1-8. Downverter 132 and Group of Low Voltage Auxiliary Devices 134]

As shown in FIG. 1, the vehicle 10 further includes a downverter 132 (hereinafter referred to as the "DV 132") and a group of low voltage auxiliary devices 134. The output from the DV 132 may be outputted to a low voltage battery (not shown). The DV 132 decreases the primary voltage V1 of the DC/DC converter 78, and outputs the primary voltage V1 to the group of low voltage auxiliary devices 134. The group of low voltage auxiliary devices 134 includes, e.g., lamps (lights), various sensors, and the ECU 24.

2. Control According to Present Embodiment

Next, control in the ECU 24 will be described.

[2-1. Basic Control]

Figure 3:
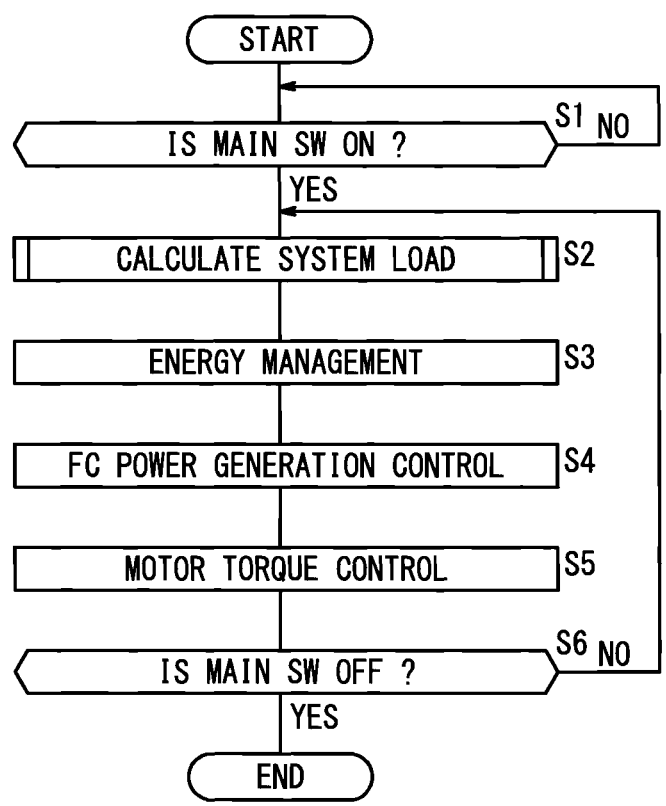
FIG. 3 is a flow chart showing basic control in an electronic control unit (ECU)

FIG. 3 is a flow chart showing basic control in the ECU 24. In step S1, the ECU 24 determines whether or not the main SW 120 is in an ON state. If the main SW 120 is not in the ON state (S1: NO), step S1 is repeated. If the main SW 120 is in the ON state (S1: YES), the control proceeds to step S2. In step S2, the ECU 24 calculates the load (system load Ls) [W] required by the power supply system 12.

In step S3, the ECU 24 performs energy management of the power supply system 12. The energy management herein is a process of calculating the power generation amount of the FC 32 (FC electric power Pfc) and the output of the battery 20 (battery output Pbat). The energy management is intended to suppress degradation of the FC stack 32, and improve the efficiency in the output of the entire power supply system 12.

Specifically, based on the system load Ls calculated in step S2, the ECU 24 determines allocation (shares) of a fuel cell's load (requested output) Lfc which should be assigned to the FC 32, a battery's load (requested output) Lbat which should be assigned to the battery 20, and a regenerative power supply's load Lreg which should be assigned to the regenerative power supply (motor 14) through adjustment.

In step S4, based on the fuel cell's load Lfc or the like determined in step S3, the ECU 24 implements control (FC power generation control) of peripheral devices of the FC stack 32, i.e., the air pump 36, the purge valve 58, the back pressure valve 60, and the water pump 68. In step S5, the ECU 24 implements torque control of the motor 14, e.g., based on the motor rotation number Nm from the rotation number sensor 112 and the opening degree θ of the accelerator pedal 118 from the opening degree sensor 110.

In step S6, the ECU 24 determines whether or not the main SW 120 is in an OFF state. If the main SW 120 is not in the OFF state (S6: NO), the control returns to step S2. If the main SW 120 is in the ON state (S6: YES), the current process is finished.

[2-2. Calculation of System Load Ls]

Figure 4:
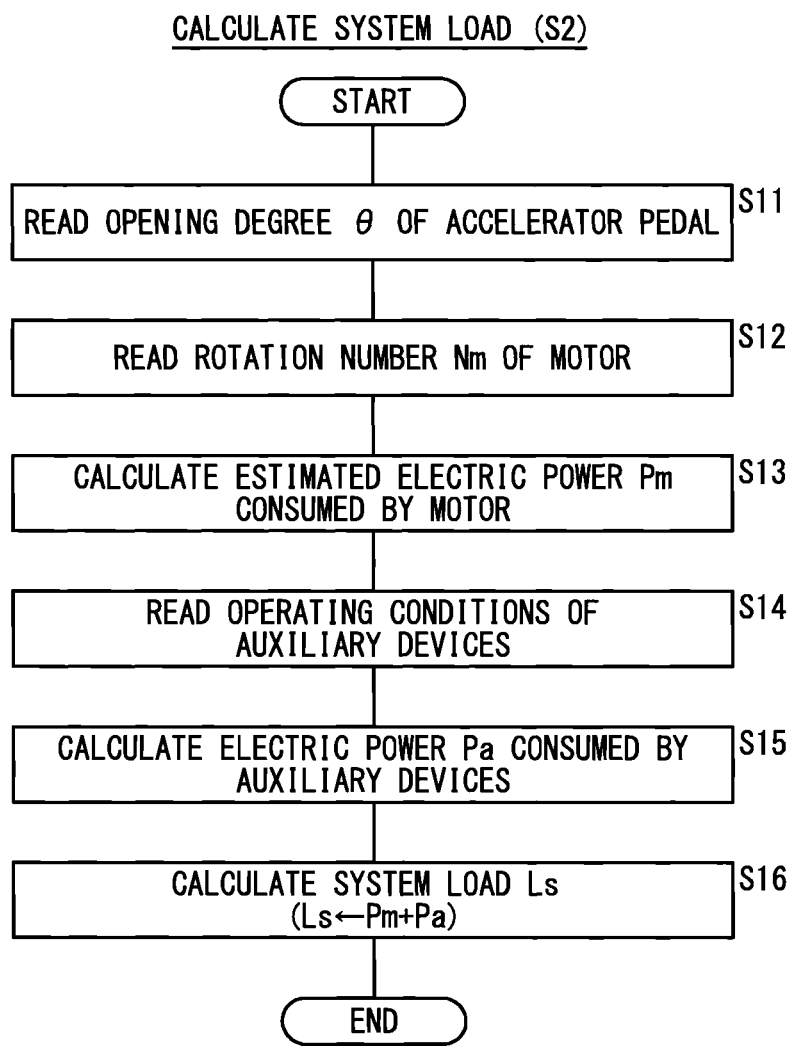
FIG. 4 is a flow chart (details of step S2 in FIG. 3) of calculating a system load.

FIG. 4 is a flow chart for calculating the system load Ls. In step S11, the ECU 24 reads the opening degree θ of the accelerator pedal 118 from the opening degree sensor 110. In step S12, the ECU 24 reads the rotation number Nm [rpm] of the motor 14 from the rotation number sensor 112.

Figure 5:
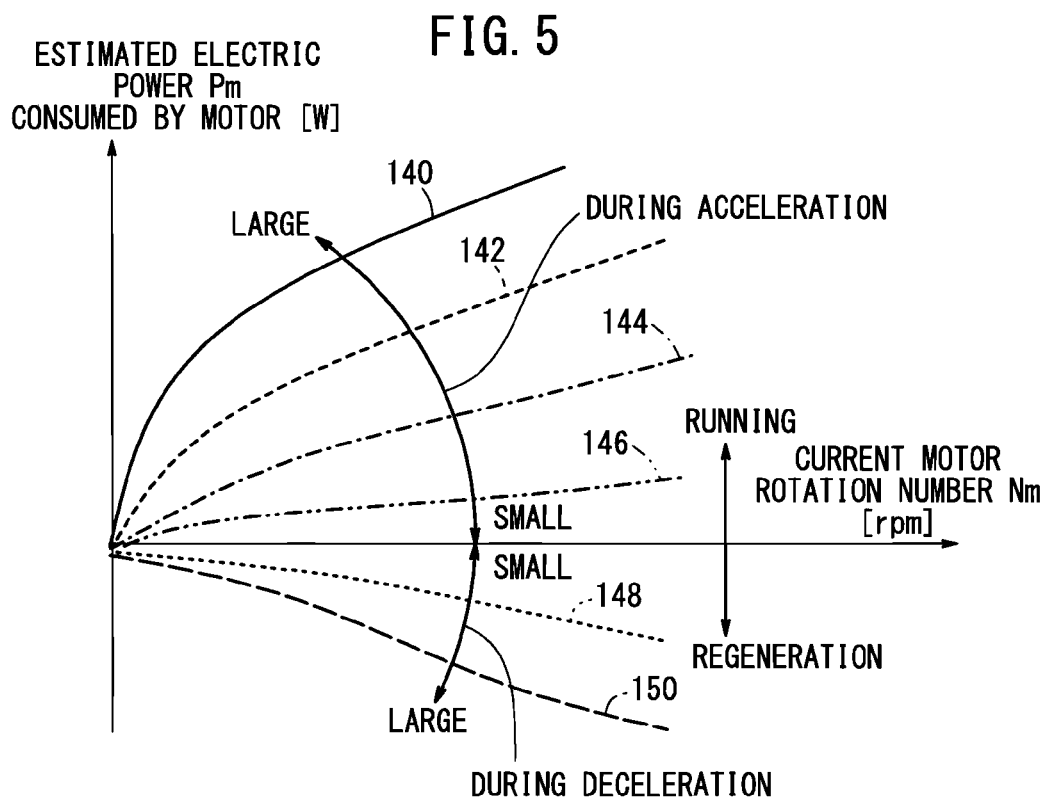
FIG. 5 is a graph showing the relationship between the current rotation number of a motor and the estimated electric power consumed by the motor.

In step S13, the ECU 24 calculates the estimated electric power Pm [W] consumed by the motor 14 based on the opening degree θ and the rotation number Nm. Specifically, in a map shown in FIG. 5, the relationship between the rotation number Nm and the estimated consumed energy Pm is stored for each opening degree θ. For example, in the case where the opening degree θ is θ1, a characteristic 140 is used. Likewise, in the cases where the opening degrees θ are θ2, θ3, θ4, θ5, and θ6, characteristics 142, 144, 146, 148, and 150 are used, respectively. After the characteristic indicating the relationship between the rotation number Nm and the consumed electric power Pm is determined based on the opening degree θ, based on the determined characteristic, the estimated consumed energy Pm in correspondence with the rotation number Nm is determined.

In step S14, the ECU 24 reads data of the current operating conditions from auxiliary devices. For example, the auxiliary devices herein include auxiliary devices operated at high voltage, such as the air pump 36, the water pump 68, and the air conditioner (not shown), and auxiliary devices operated at low voltage, such as the low voltage battery (not shown), the accessory, and the ECU 24. For example, as for the operating conditions of the air pump 36 and the water pump 68, the rotation number Nap [rpm] of the air pump 36 and the rotation number Nwp [rpm] of the water pump 68 are read respectively. As for the operating condition of the air conditioner, output settings of the air conditioner are read.

In step S15, the ECU 24 calculates the electric power Pa [W] consumed by the auxiliary devices depending on the present operating conditions of the auxiliary devices. In step S16, the ECU 24 calculates the estimated consumed electric power in the entire FC vehicle 10 (i.e., system load Ls) by summing the estimated electric power Pm consumed by the motor 14 and the electric power Pa consumed by the auxiliary devices.

[2-3. Output Limit of Air Conditioner 130 and FC 32]

In the present embodiment, based on whether or not the vehicle 10 is in the middle of long distance hill climbing (in particular, in the middle of high speed hill climbing), limit values (upper limit values) are set on electric power consumed by the air conditioner 130 and electric power generated in power generation of the FC 32. That is, the limit value for electric power consumed by the air conditioner 130 (hereinafter referred to as the "air conditioner electric power limit value Palim") is used at the time of calculating the electric power Pa consumed by the auxiliary devices in step S2 of FIG. 3 (more specifically, in step S15 of FIG. 4). Further, the upper limit value of the FC electric power Pfc (hereinafter referred to as the "FC output upper limit value Pfclim") is used at the time of calculating the fuel cell's load Lfc in step S3 of FIG. 3.

Figure 6:
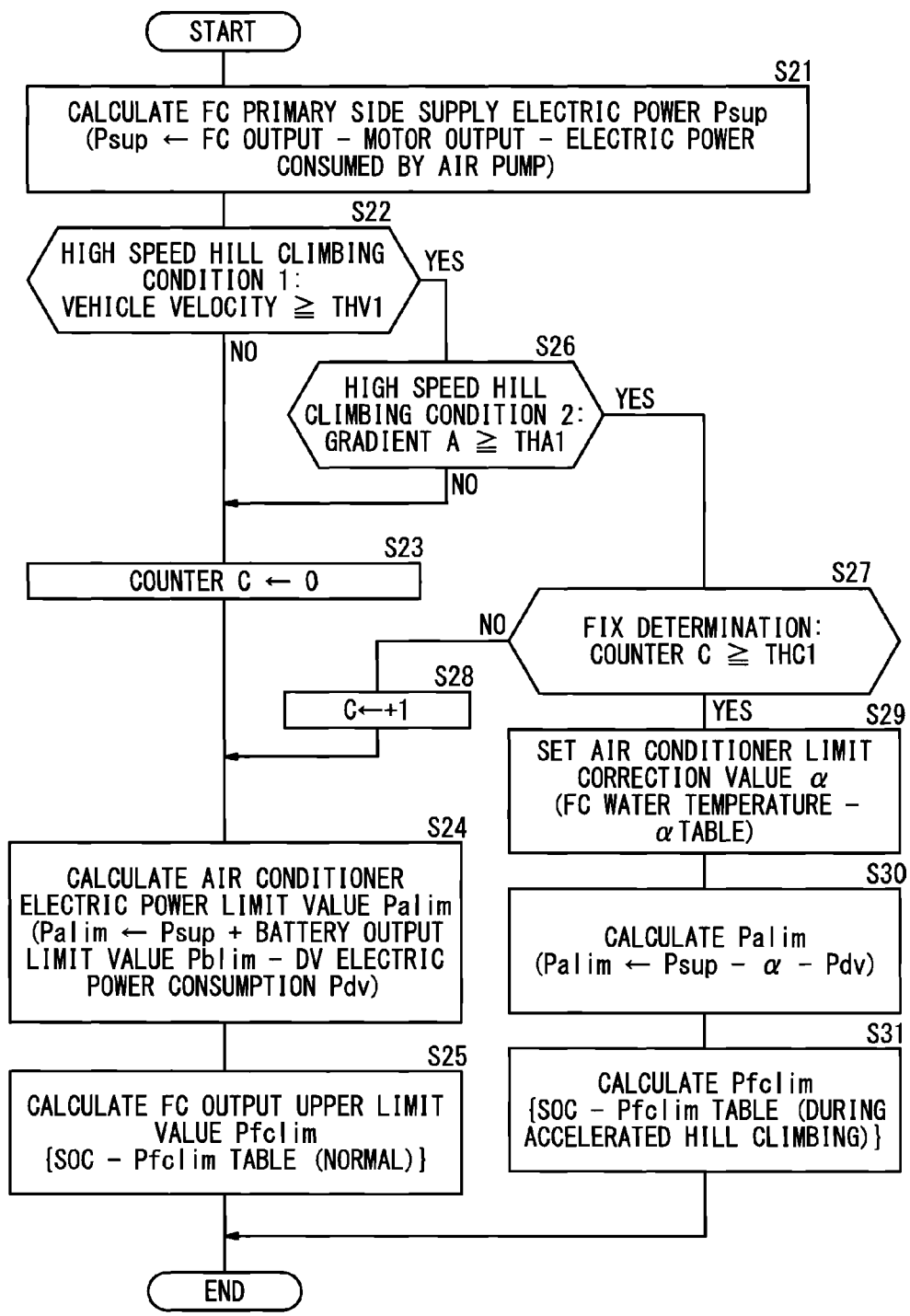
FIG. 6 is a flow chart for setting an electric power limit value of an air conditioner and an FC output upper limit value.

FIG. 6 is a flow chart for setting the air conditioner electric power limit value Palim and the FC output upper limit value Pfclim. In step S21, the ECU 24 (power generation control function 122) calculates FC primary side supply electric power Psup. The FC primary side supply electric power Psup can be calculated by subtracting the output of the motor 14 and the electric power consumed by the air pump 36 from the power generation amount of the FC (i.e., FC output Pfc), and represents electric power that can be supplied to the load excluding the motor 14 and the air pump 36.

In step S22, the ECU 24 determines whether or not the vehicle velocity V [km/h] is equal to or more than a vehicle velocity threshold THV1 (hereinafter also referred to as the "threshold THV1") for determining whether the vehicle 10 is in the middle of high speed hill climbing. The vehicle velocity threshold THV1 is a first condition for determining whether or not the vehicle 10 is in the middle of high speed hill climbing (hereinafter referred to as the "high speed hill climbing condition 1"). The vehicle velocity V is calculated by the ECU 24 based on the motor rotation number Nm. If the vehicle velocity V is less than the threshold value THV1 (S22: NO), it is determined that the vehicle 10 is not in the middle of high speed hill climbing.

In step S23, the ECU 24 resets a counter C by inputting zero to the counter C. The counter C is used for fixing determination that the vehicle 10 is in the middle of high speed hill climbing. Then, in step S24, the ECU 24 calculates the air conditioner electric power limit value Palim based on the following expression (1).

$$P\text{alim} = FC \text{ primary side supply electric power } P\text{sup} + \text{battery output limit value } Pb\text{lim} - DV \text{ electric power consumption } Pdv \quad (1)$$

In the above expression (1), the battery output limit value Pblim represents the output limit value (upper limit value) of the battery 20, and the "DV electric power consumption Pdv" represents electric power consumed by the downverter 132.

Then, in step S25, the ECU 24 sets the FC output upper limit value Pfclim based on the SOC of the battery 20. More specifically, the FC output upper limit value Pfclim in correspondence with the SOC is determined based on an FC output upper limit value characteristic 160 during normal operation in an FC output upper limit value table shown in FIG. 7.

Figure 7:
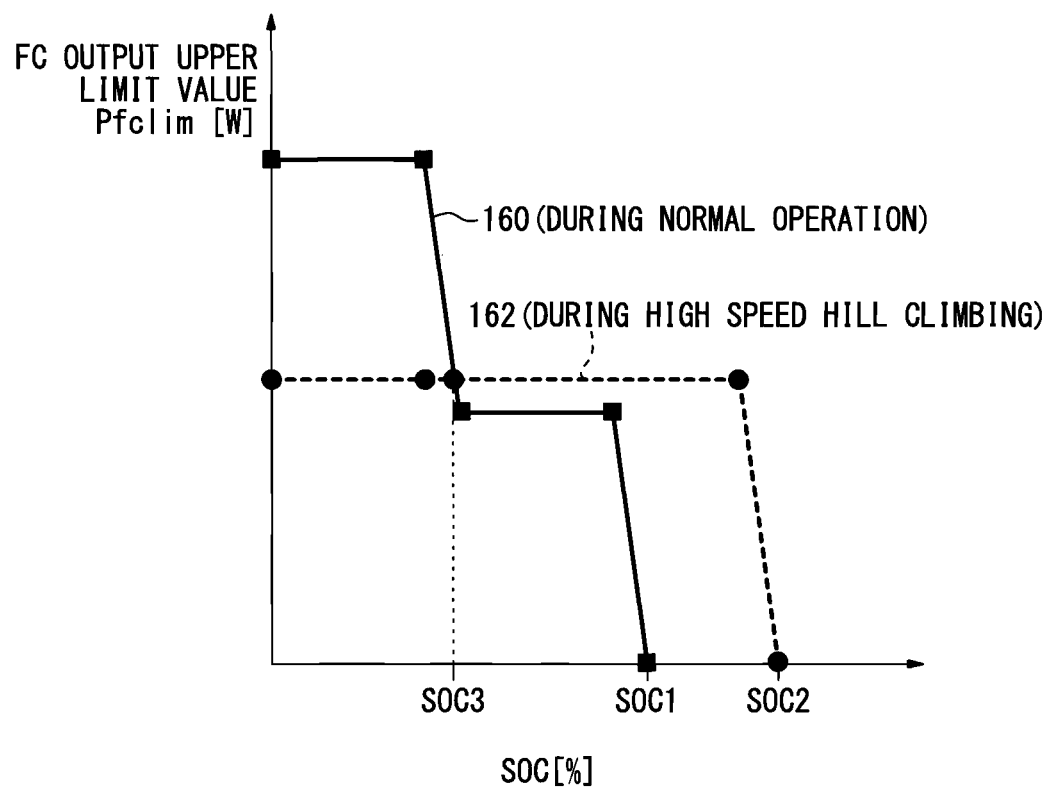
FIG. 7 is a graph showing an FC output upper limit value table for defining the relationship between the SOC of the battery and the FC output upper limit value.

As shown in FIG. 7, according to the FC output upper limit value characteristic 160 during normal operation in the FC output upper limit value table, when the SOC is SOC1 or more, the FC output upper limit value Pfclim is zero. This is because, in the case where the SOC is excessively large, it is advantageous to use electric power from the battery 20, rather than to perform power generation of the FC 32, for improving the power generation efficiency of the power supply system 12 as a whole. Further, in the FC output upper limit value characteristic 160 during normal operation, when the SOC is less than SOC1, as the SOC decreases, the FC output upper limit value Pfclim is increased. This is because, when the SOC is low, the output of the FC 32 is used to compensate for the shortage of the output of the battery 20, and with excessive electric power, the battery 20 is charged.

Referring back to step S22, if the vehicle velocity V is the threshold value THV1 or more, and thus the high speed hill climbing condition 1 is satisfied (S22: Yes), then, in step S26, the ECU 24 determines whether or not a gradient A detected by a gradient sensor 116 is equal to or more than a gradient threshold value THA1 (hereinafter referred to as the "threshold THA1") for determining whether or not the vehicle 10 is in the middle of high speed hill climbing. The threshold THA1 is a second condition for determining whether or not the vehicle 10 is in the middle of high speed hill climbing (hereinafter referred to as the "high speed hill climbing condition 2"). If the gradient A is less than the threshold value THA1 (S26: NO), it is determined that the vehicle 10 is not in the middle of high speed hill climbing. Then, the process proceeds to step S23 for performing the procedures as described above.

If the gradient A is the threshold value THA1 or more (S26: YES), then, in step S27, the ECU 24 determines whether or not determination that the vehicle 10 is in the middle of high speed hill climbing should be fixed. Specifically, it is determined whether or not the counter C is equal to or more than the counter threshold value THC1 for fixing the determination. If the counter C is less than the threshold value THC1 (S27: NO), then, in step S28, the ECU 24 increments the counter C by 1, and the process proceeds to step S24. If the counter C is the threshold value THC1 or more (S27: YES), the determination that the vehicle 10 is in the middle of high speed hill climbing is fixed, and the process proceeds to step S29.

In step S29, the ECU 24 sets the air conditioner limit correction value α (hereinafter also referred to as the "correction value α"). The correction value α is a value for limiting the output of the air conditioner 130 during high speed hill climbing, and the correction value α is determined based on the water temperature Tw of the coolant water detected by the temperature sensor 70. More specifically, in the air conditioner limit correction value table shown in FIG. 8, the air conditioner limit correction value α corresponding to the water temperature Tw of the coolant water is used.

Figure 8:
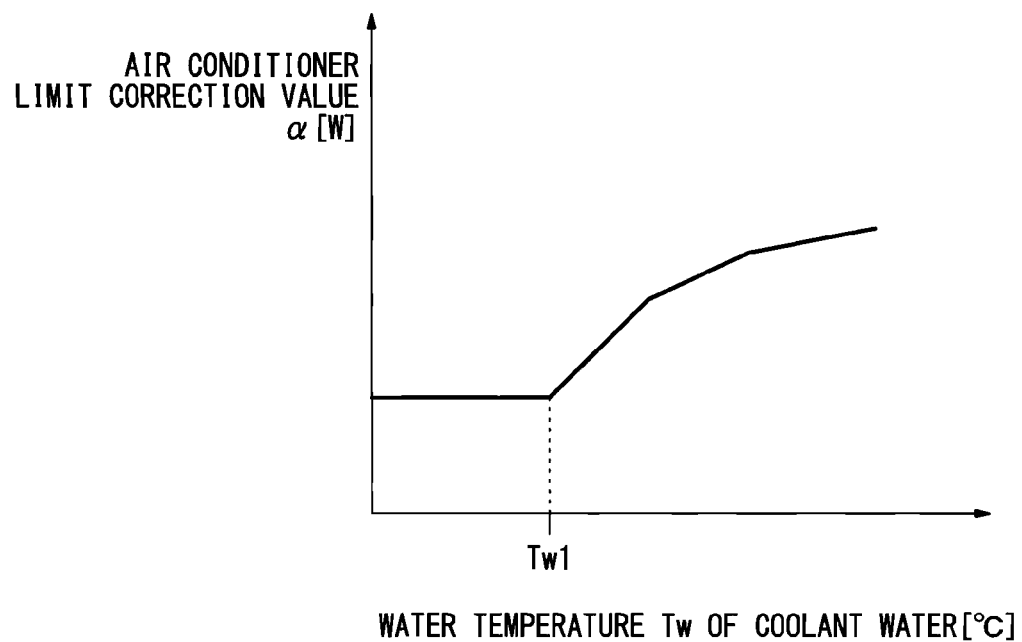
FIG. 8 is a graph showing an air conditioner limitation correction value table for defining the relationship between the temperature of coolant water for the fuel cell and the air conditioner limitation correction value.

As can be seen from FIG. 8, in the air conditioner limit correction value table, if the water temperature Tw is the threshold value Tw1 or less, the correction value α is constant. Further, if the water temperature Tw exceeds the threshold value Tw1, the correction value α is increased gradually. Therefore, if the water temperature Tw exceeds the threshold value Tw1, as the water temperature Tw increases, the output limit on the air conditioner 130 is increased. Thus, as the water temperature Tw becomes high, it becomes possible to further suppress the increase in the temperature of the FC 32.

In step S30 of FIG. 6, the ECU 24 calculates the air conditioner electric power limit value Palim during high speed hill climbing based on the following expression (2).

$$P\text{alim} = FC \text{ primary side supply electric power } P\text{sup} - \text{air conditioner limit correction value } \alpha - DV \text{ electric power consumption } Pdv \quad (2)$$

In contrast to the air conditioner electric power limit value Palim (see the above expression (1)) in the case where the vehicle is not in the middle of high speed hill climbing (during normal operation), in the air conditioner electric power limit value Palim in the case where the vehicle is in the middle of high speed hill climbing (see expression (2)), the air conditioner limit correct value α is subtracted (S30), and there is no addition of the battery output limit value Pblim. Thus, electric power consumed by the air conditioner 130 is suppressed, and by providing electric power for the output of the motor 14, improvement in the drivability is achieved. Further, by suppressing the output from the battery 20, it becomes possible to prevent excessive discharging electric power from the battery 20 during high speed hill climbing.

In step S31, the ECU 24 determines the FC output upper limit value Pfclim based on the SOC of the battery 20. More specifically, using an FC output upper limit value characteristic 162 at the time of high speed hill climbing in the FC output upper limit value table shown in FIG. 7, the FC output upper limit value Pfclim is determined in correspondence with the SOC.

As can be seen from FIG. 7, in the FC output upper limit value characteristic 162 at the time of high speed hill climbing, the FC output upper limit value Pfclim is zero when the SOC is the SOC2 or more. In comparison with the FC output upper limit value characteristic 160 during normal operation, the SOC where the FC output upper limit value Pfclim is zero is higher, for preventing the SOC of the battery 20 from being decreased to the lowest value (e.g., zero) even if the required system load Ls is kept high for long distance hill climbing.

Further, in the FC output upper limit value characteristic 162 during high speed hill climbing, when SOC is less than SOC3, the FC output upper limit value Pfclim is lower in comparison with the FC output upper limit value characteristic 160 during normal operation. This is intended to suppress overheating of the FC 32, and maintain a desired drivability.

That is, in the present embodiment, except the case where the SOC is low from a time point immediately after long distance hill climbing is started, during long distance hill climbing (in particular, during high speed hill climbing), the SOC may be decreased gradually. In the present embodiment, the FC output upper limit value Pfclim is high (the FC output upper limit is relaxed) during long distance hill climbing (in a region where the SOC is between the SOC3 and the SOC2). Therefore, the FC 32 could be overheated by power generation before the SOC becomes low (Since heat produced in the FC 32 is proportional to the square of the FC current Ifc, as the electrical current is higher, the amount of heat produced in the FC 32 is increased). In the case where the FC 32 is overheated, it may become necessary to take some actions, e.g., significantly limit power generation of the FC 32, or stop power generation of the FC 32. In the case where such actions are required, drivability becomes significantly poor in the middle of hill climbing. In the present embodiment, in the region where the SOC is low (less than SOC3), the FC output limit value Pfclim for SOC recovery which is performed during the normal condition is not high (FC output limit is not relaxed). Thus, even if long distance hill climbing continues, it becomes possible to suppress overheating of the FC 32, and maintain a desired drivability.

Further, in the case where the FC output Pfc is increased in the state where the power generation efficiency is low, the fuel gas is consumed rapidly. Therefore, it is required to suppress the amount of consumption of the fuel gas at the time of long distance hill climbing, and prevent excessive use of the fuel gas.

3. Advantages of the Present Embodiment

As described above, in the present embodiment, in the case where long distance hill climbing (in particular, long distance high speed climbing) has been detected, the fuel cell's load Lfc (allocation amount of electric power outputted from the fuel cell) is controlled to be larger than that before detection of the long distance hill climbing (In FIG. 7, if the SOC exceeds SOC3, the FC output upper limit value Pfclim is increased). Thus, since the battery's load Lbat is decreased relatively, during long distance hill climbing of the FC vehicle 10, it becomes possible to prevent the SOC of the battery 20 from being rapidly decreased due to large output discharging, and prevent assistance by the battery 20 from being disabled (i.e., it becomes possible to prevent the battery 20 from running out of electric power).

In the present embodiment, if the ECU 24 (long distance hill climbing detection function 124) detects long distance hill climbing, the output of the air conditioner 130 is limited depending on increase in the temperature Tw of the coolant water. Thus, by limiting the output of the air conditioner 130 during the long distance hill climbing of the FC vehicle 10, excessive electric power can be utilized for the output of the motor 14. Additionally, for example, in the case where heat from the air conditioner 130 raises the temperature of the FC 32 or the coolant, or in the case where the coolant for the FC 32 is also utilized for cooling the air conditioner 130, by limiting the output of the air conditioner 130 to suppress heat produced in the air conditioner 130, even if the FC output Pfc is increased, it becomes possible to suitably protect the FC 32 against the heat. Further, it becomes possible to prevent the output and the efficiency of the FC 32 from being lowered due to overheating of the FC 32.

In the present embodiment, the upper limit values SOC1 and SOC2 for performing power generation of the FC 32 are set. If the SOC exceeds the upper limit values SOC1 and the SOC2, power generation of the FC 32 is not performed. If the ECU 24 (long distance hill climbing detection function 124) detects long distance hill climbing, the upper limit value of the SOC is increased. In this manner, during long distance hill climbing, even if the SOC is high, power generation of the FC 32 can be performed. Thus, even if the required system load Ls is kept high for long distance hill climbing, since the output of the FC 32 can be adjusted suitably in accordance with the system load Ls, it becomes possible to prevent the SOC from being lowered at an early stage, and prevent assistance by the battery 20 from being disabled at an early stage.

In the present embodiment, the FC output upper limit value Pfclim is set depending on the SOC, and if the ECU 24 (long distance hill climbing detection function 124) detects long distance hill climbing, in a region where the SOC is low, the FC output upper limit value Pfclim is lower in comparison with the case where long distance hill climbing is not detected (FIG. 7). In this manner, overheating of the FC 32 can be suppressed, and a desired drivability can be maintained.

That is, in the present embodiment, except the case where the SOC is low from a time point immediately after long distance hill climbing is started, during the long distance hill climbing (in particular, during high speed hill climbing), the SOC may be decreased gradually. In the present embodiment, since the FC output upper limit value Pfclim during long distance hill climbing is increased (the FC output limit is relaxed), the FC 32 may be overheated before the SOC becomes low (Since heat produced in the FC 32 is proportional to the square of the FC current Ifc, as the electrical current is higher, the amount of heat produced in the FC 32 is increased). In the case where the FC 32 is overheated, it becomes necessary to take some actions, e.g., significantly limit power generation of the FC 32 or stop power generation of the FC 32. If such actions are required, the drivability becomes significantly poor in the middle of hill climbing. In the present embodiment, when the SOC is low (less than SOC3), the FC output upper limit value Pfclim for SOC recovery which is performed during the normal condition is not high (the FC output upper limit is not relaxed). Thus, even if long distance hill climbing continues, it becomes possible to suppress overheating of the FC 32, and maintain a desired drivability.

Further, in the case where the FC output Pfc is increased in the state where the power generation efficiency is low, the fuel gas is consumed rapidly. In order to address the problem, in the present embodiment, the amount of consumption of the fuel gas is suppressed during long distance hill climbing. Thus, it becomes possible to prevent the fuel gas from being used excessively.

4. Modified Embodiment

The present invention is not limited to the above described embodiment. The present invention can adopt various structures based on the description herein. For example, the following structure may be adopted.

[4-1. Application of Power Supply System]

Though the power supply system 12 is mounted in the FC vehicle 10 in the above described embodiment, the present invention is not limited in this respect. The power supply system 12 may be mounted in other objects. For example, the power supply system 12 may be used in movable objects such as electric power-assisted bicycles, ships, or air planes.

[4-2. Structure of Power Supply System 12]

Figure 9:
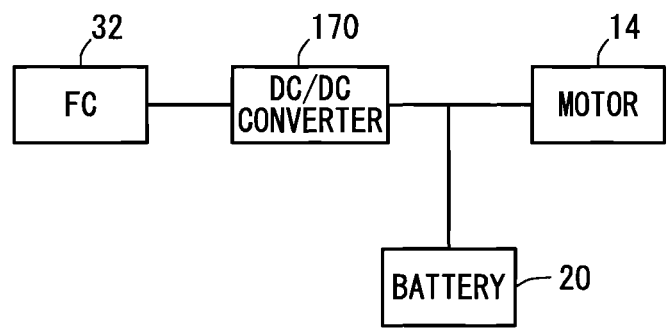
FIG. 9 is a block diagram schematically showing a structure of a first modified example of the power system according to the embodiment.
Figure 10:
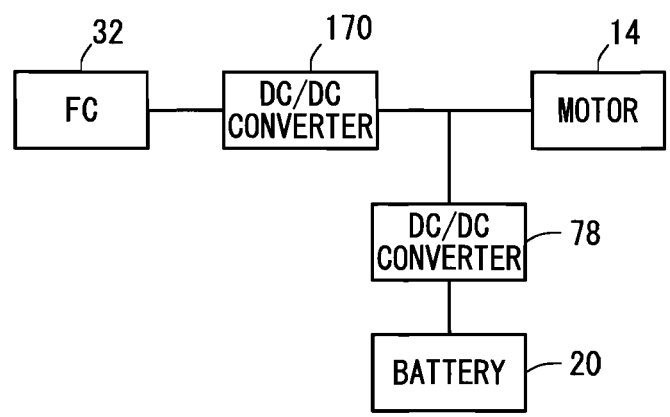
FIG. 10 is a block diagram schematically showing a structure of a second modified example of the power system according to the embodiment.
Figure 11:
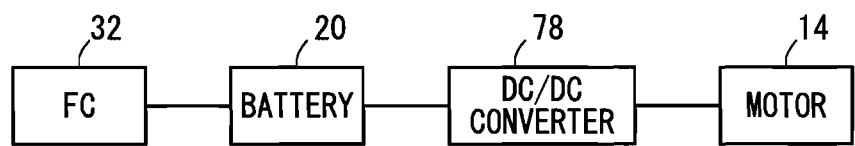
FIG. 11 is a block diagram schematically showing a structure of a third modified example of the power system according to the first embodiment.

In the embodiments, the FC 32 and the battery 20 are arranged in parallel, and the DC/DC converter 78 is provided on the near side the battery 20. However, the present invention is not limited in this respect. For example, as shown in FIG. 9, the FC 32 and the battery 20 may be provided in parallel, and a step-up, step-down, or step-up/step-down DC/DC converter 170 may be provided on the near side of the FC 32. Alternatively, as shown in FIG. 10, the FC 32 and the battery 20 may be provided in parallel, the DC/DC converter 170 may be provided on the near side of the FC 32, and the DC/DC converter 78 may be provided on the near side of the battery 20. Alternatively, as shown in FIG. 11, the FC 32 and the battery 20 may be provided in series, and the DC/DC converter 78 may be provided between the battery 20 and the motor 14.

[4-3. Determination of Long Distance Hill Climbing (High Speed Hill Climbing)]

In the above embodiment, determination of whether the FC vehicle 10 is in the middle of long distance hill climbing (in particular, high speed hill climbing) is made based on the vehicle velocity V calculated based on the motor rotation number Nm and the gradient A from the gradient sensor 116 (S22 and S26 of FIG. 6). However, the present invention is not limited in this respect. For example, determination of whether the FC vehicle 10 is in the middle of long distance hill climbing may be made using the vehicle velocity V determined based on position information from a navigation apparatus (not shown). Alternatively, gradient information of roads may be stored in the navigation apparatus, or the gradient information may be obtained from an external apparatus (e.g., server) through wireless communication means (not shown) to use the gradient information.

Alternatively, in the case of determining whether or not the FC vehicle is in the middle of long distance hill climbing regardless of the vehicle velocity V, for example, step S22 of FIG. 6 may be omitted, and the determination can be made by steps S26 and S27. Alternatively, whether or not the FC vehicle is in the middle of long distance hill climbing can be determined based on map information of the navigation apparatus. Stated otherwise, in the case of using the counter C in step S27, determination of the long distance hill climbing is made based on continuation of hill climbing. In the case where determination is made based on the map information, it becomes possible to determine (predict) whether or not the FC vehicle 10 will run uphill a long distance.

[4-4. Output Limit of FC 32]

Figure 12:
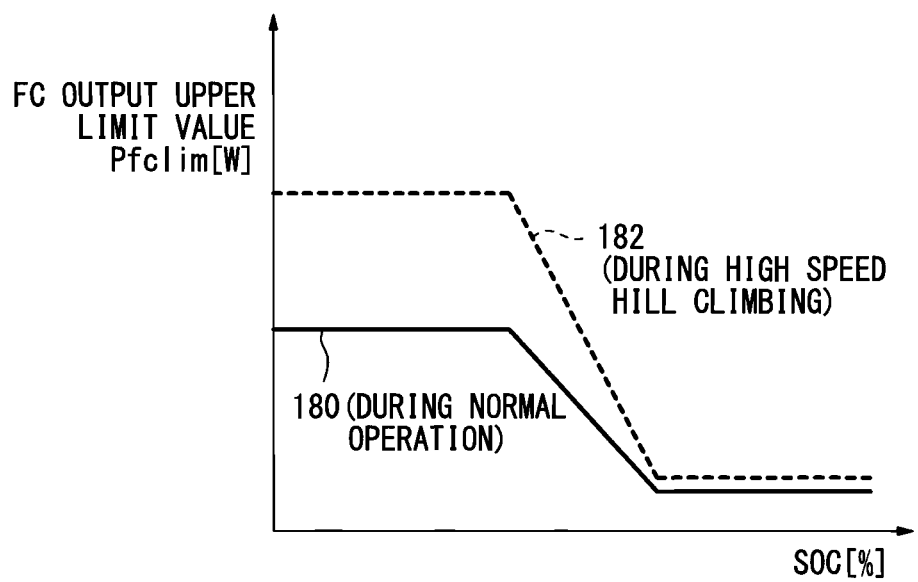
FIG. 12 is a graph showing a modified example of the FC output upper limit value table shown in FIG. 7.

In the above embodiment, in comparison with the case where the FC vehicle 10 is not in the middle of high speed hill climbing, in a range where the SOC exceeds SOC3, the FC output upper limit value Pfclim during high speed hill climbing is increased (the FC output upper limit is relaxed). However, the range where the FC output upper limit value Pfclim is increased is not limited to this range. For example, as shown in FIG. 12, even in the region where the SOC is low, an FC output upper limit value characteristic 182 during high speed hill climbing may exceed an FC output upper limit value characteristic 180 during normal operation. Further, instead of increasing the FC output upper limit value Pfclim, during the high speed hill climbing, the FC output Pfc during normal operation may be multiplied by a predetermined coefficient or a predetermined value may be added to the FC output Pfc during normal operation.

In the above embodiment, in comparison with the case where the FC vehicle 10 is not in the middle of high speed hill climbing, in the case where the FC vehicle 10 is in the middle of high speed hill climbing, the upper limit value of the SOC for performing power generation of the FC 32 is set to be high (normal state: SOC1→high speed hill climbing state: SOC2). However, the upper limit value of the SOC for performing power generation of the FC 32 may be set in a different manner. For example, during high speed hill climbing, the upper limit value may not be provided. Alternatively, the same upper limit value may be used regardless of whether the FC vehicle 10 is in the middle of high speed hill climbing or not.

[4-5. Output Limit of Air Conditioner 130]

In the above embodiment, during high speed hill climbing, the air conditioner electric power limit value Palim is set depending on the temperature Tw of the coolant water for cooling the FC 32 (FIG. 8). However, the manner of limiting the output of the air conditioner 130 during high speed hill climbing is not limited in this respect. For example, during high speed hill climbing, as the system load Ls increases or the fuel cell's load Lfc increases, the air conditioner electric power limit value Palim may be set to be large. Alternatively, in the case where the FC vehicle 10 is in the middle of high speed hill climbing, as the gradient A is larger, or as the vehicle velocity V is higher, the air conditioner electric power limit value Palim may be set to be large. Alternatively, in the case where the FC vehicle 10 is in the middle of high speed hill climbing, the output of the air conditioner 130 may be adjusted to a predetermined lowest value (including zero).

In the above embodiment, the air conditioner electric power limit value Palim is provided during high speed hill climbing. Alternatively, the air conditioner electric power limit value Palim may not be provided.

While the invention has been particularly shown and described with reference to a preferred embodiment, it will be understood that variations and modifications can be effected thereto by those skilled in the art without departing from the spirit of the invention as defined by the appended claims.

What is claimed is:

1. A fuel cell vehicle comprising:
   a traction motor;
   a fuel cell for supplying electric power to the traction motor;
   an energy storage device for supplying electric power to the traction motor, the energy storage device being capable of being charged with regenerative electric power of the traction motor or electric power generated in the fuel cell;
   a power distribution apparatus for controlling targets to which electric power generated in the fuel cell, electric power outputted from the energy storage device, and regenerative electric power of the traction motor are supplied;

a long distance hill climbing detector for detecting long distance hill climbing of the fuel cell vehicle; and a controller for, in the case where the long distance hill climbing detector detects the long distance hill climbing, controlling an allocation amount of electric power outputted from the fuel cell such that the allocation amount of electric power outputted from the fuel cell is larger than the allocation amount before the detection of the long distance hill climbing, wherein in the case where long distance hill climbing is detected, load on the energy storage device is decreased relatively to an increase in load on the fuel cell.

2. The fuel cell vehicle according to claim 1, further comprising a cooling apparatus for cooling the fuel cell by a coolant, wherein in the case where the long distance hill climbing detector detects the long distance hill climbing, an output of an air conditioner is limited depending on increase in a temperature of the fuel cell.

3. The fuel cell vehicle according to claim 1, wherein the energy storage device is a battery;

wherein an upper limit value of state of charge of the battery for performing power generation of the fuel cell is set, and if the state of charge exceeds the upper limit value, power generation of the fuel cell is not performed; and wherein in the case where the long distance hill climbing detector detects the long distance hill climbing, the upper limit value of the state of charge is increased.

4. The fuel cell vehicle according to claim 3, wherein an output upper limit value of the fuel cell is set depending on the state of charge; and wherein in the case where the long distance hill climbing detector detects the long distance hill climbing, in a region where the state of charge is low, the output upper limit value of the fuel cell is set to be lower in comparison with the case where the long distance hill climbing detector does not detect the long distance hill climbing.

* * * * *